United States Patent
Norton et al.

(10) Patent No.: US 6,403,047 B1
(45) Date of Patent: Jun. 11, 2002

(54) TREATMENT OF GAS MIXTURES

(75) Inventors: Ian Andrew Norton; Peter Leslie Timms, both of Bristol (GB)

(73) Assignee: The BOC Group plc, Windlesham (GB)

(*) Notice: Subject to any disclaimer, the term of this patent is extended or adjusted under 35 U.S.C. 154(b) by 98 days.

(21) Appl. No.: 09/678,771

(22) Filed: Oct. 4, 2000

(30) Foreign Application Priority Data

Oct. 8, 1999 (GB) ................................ 9923951

(51) Int. Cl.⁷ .......................... A62D 3/00; B01D 53/70
(52) U.S. Cl. .................. 423/240 S; 423/245.1; 588/206
(58) Field of Search .................. 423/240 S, 240 R, 423/245.1, 488; 588/206

(56) References Cited

U.S. PATENT DOCUMENTS

| | | | |
|---|---|---|---|
| 3,972,709 A | * 8/1976 | Chia et al. ................. | 75/680 |
| 4,631,183 A | 12/1986 | Lalancette et al. ......... | 423/240 S |
| 5,322,674 A | * 6/1994 | Mori ........................ | 423/240 S |
| 5,344,630 A | * 9/1994 | Brendley et al. ........... | 588/206 |
| 5,468,459 A | * 11/1995 | Tamhankar et al. ......... | 423/245.1 |
| 5,817,284 A | * 10/1998 | Nakano et al. ............. | 423/240 S |
| 6,023,007 A | * 2/2000 | Nakajo et al. .............. | 588/206 |
| 6,069,291 A | * 5/2000 | Rossin et al. .............. | 588/206 |
| 6,294,709 B1 | * 9/2001 | Izumikawa et al. ......... | 423/240 S |

FOREIGN PATENT DOCUMENTS

| | | |
|---|---|---|
| EP | 0 384 802 A1 | 8/1990 |
| EP | 0 595 079 A1 | 5/1994 |
| EP | 0 663 233 A1 | 7/1995 |
| EP | 0 819 449 A1 | 1/1998 |
| JP | 50-97594 * | 8/1975 ............. 423/240 S |
| JP | 59-109227 * | 6/1984 ............. 423/240 S |

* cited by examiner

*Primary Examiner*—Ngoc-Yen Nguyen
(74) *Attorney, Agent, or Firm*—Philip H. Von Neida; Salvatore P. Pace

(57) ABSTRACT

A method for treating a gas stream containing one or more perfluoro-organic compounds to remove the perfluoro-organic compound(s) therefrom, which comprises bringing the gas stream in to contact with an alkali metal fluoride in the presence of carbon and water vapor at a temperature of 350° C. to 1000°C.

9 Claims, 1 Drawing Sheet

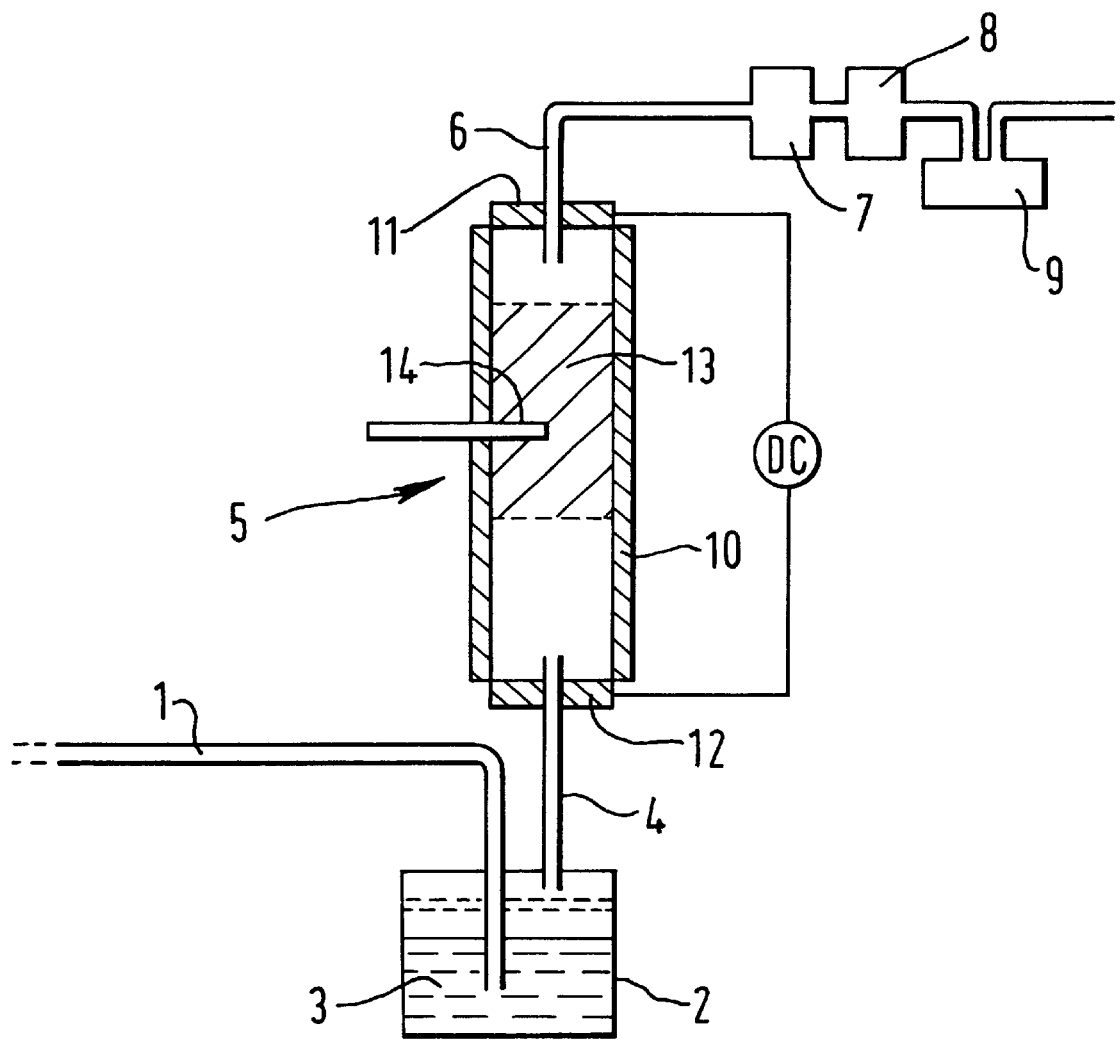

TREATMENT OF GAS MIXTURES

FIELD OF THE INVENTION

This invention relates to the treatment of gas mixture and in particular of waste gas streams used in the electronics industry, especially those containing perfluoroalkanes such as hexafluoroethane ($C_2F_6$) and tetrafluoromethane ($CF_4$).

BACKGROUND OF THE INVENTION

The electronics industry makes extensive use of hexafluoroethane and, to a lesser extent, of tetrafluoromethane, commonly mixed with oxygen, for the plasma etching of semi-conductor devices under reduced pressure. The waste gases pumped out from the etching apparatus generally contain unreacted hexafluoroethane and/or tetrafluoromethane which may be mixed with other gases or vapours, particularly silicon tetrafluoride ($SiF_4$) and carbonyl fluoride ($COF_2$), and which may be diluted with nitrogen used to purge the vacuum pumps associated with the apparatus.

Although hexafluoroethane and tetrafluoromethane can be considered to have low toxicity when released in to the environment, they are "greenhouse" gases with a strong ability to absorb infra-red radiation; in addition, they are believed to persist in the atmosphere for hundreds of years and their long-term effect on the environment is considered to be very deleterious. It is therefore extremely important that both these gases are removed from the waste gases prior to release in to the atmosphere.

A variety of methods are known to remove and/or to destroy most of the environmentally harmful gaseous substances contained in waste gas streams to prevent their release in to the atmosphere. However, hexafluoroethane and tetrafluoromethane present particular problems because they are so chemically inert that they are generally unaffected by, and therefore pass straight through, known aqueous scrubbing systems or solid reactant scrubbing devices at ambient temperatures.

Although both gases are known to be destroyed:
i) at temperatures in excess of 1000° C.
   a) by reaction with either silicon or silica
   b) by reaction with hydrogen or hydrogen containing gas in a plasma for flame.
ii) at temperatures of 900° C. to 700° C.
   c) by a method according to our prior European Application No. 0 384 802 by passing them through a heated packed layer containing one or more of silicon, molybdenum, tungsten, molybdenum silicide and tungsten silicide, and thereafter treating a reaction product with an alkali, for example soda lime.
   d) by a method according to our prior European Application No 0 663 233 in which a gas stream containing one or more perfluoro-organic compounds is brought in to contact with a sodium or potassium salt, providing a source of sodium or potassium ions via thermal reduction with elemental silicon or a silicon alloy.
iii) at temperatures of 500° C. to 300° C.
   e) by a method according German Patent Application No. 4 404 329 in the name of L'Air Liquide in which the irreversible absorption of $CF_4$ on high surface area silicates and clays can be achieved.

However, these methods suffer from the disadvantage that such high temperatures must be used for the method to proceed or the life-time of the reagents can be relatively short.

SUMMARY OF THE INVENTION

The present invention provides an improved method for the destruction of perfluoroalkanes which generally allows for increased destruction yields and which generally has a potentially extended life for the reagent.

In accordance with the invention, there is provided a method for treating a gas stream containing one or more perfluoro-organic compounds to remove the perfluoro-organic compound(s) therefrom, which comprises bringing the gas stream in to contact with an alkali metal fluoride in the presence of carbon and water vapour at a temperature of from 350° C. (preferably from 550° C.) to 1000° C.

The alkali metal fluoride is preferably caesium fluoride (CsF), potassium fluoride (KF), sodium fluoride (NaF) or lithium fluoride (LiF) or mixtures thereof. Of these caesium fluoride and potassium fluoride are preferred as they allow the method of the invention to be performed at the lower end of the temperature range. Caesium fluoride is particularly advantageous.

The method may utilise the alkali metal fluoride itself at the beginning of the method or, alternatively, the fluoride may be formed in situ during the process by reaction of many other salts including the carbonate, and hydroxide.

Carbon is preferably present in any standard form including activated carbons or activated charcoals. It may also be a nut charcoal, coconut husks and carbon made by hydrolysing cellulose. It should generally be in granular or powdered form and have a high surface area. The carbon advantageously has hydrophilic properties.

The carbon preferably provides a support for the alkali metal fluoride being used in the method of the invention. This can be achieved, for example, by mixing an aqueous solution of the alkali metal fluoride with the carbon and evaporating the water in an oven leaving a dry, or substantially dry, powder mix. Alternatively, the alkali metal fluoride and the carbon may be simply mixed together.

Water must be present in the method of the invention and can advantageously be added to the gas stream prior to its contact with the alkali metal fluoride, for example by bubbling the gas stream through a water bath. Alternatively, water may be introduced directly in to the reaction zone to form steam directly at the temperature required in the method.

The temperatures used in the method of the invention must be within the range of 350° C. to 1000° C. Within this range, generally lower temperatures, for example from 350° C. to 830° C. can be used with caesium fluoride with temperatures rising somewhat for potassium fluoride, for example from 570° C. to 870° C., sodium fluoride, for example from 650° C. to 930° C. and lithium fluoride, for example from 670° C. to 960° C., i.e. in that order.

An advantage of the method of the invention is that long reagent life can be achieved by virtue of the fact that regeneration of the alkali metal fluoride tends to occur in situ in the reaction zone. As such, the method can therefore be regarded as being catalytic.

It is thought that the method of the invention probably proceeds in accordance with the following general chemical equations:

$$4CsF + 4H_2O \rightarrow 4CsOH + 4HF \tag{1}$$

$$4CsOH + 2C \rightarrow 4Cs + 2H_2 + 2CO_2 \tag{2}$$

$$4Cs + CF_4 \rightarrow 4CsF + C \tag{3}$$

It can be seen from the above equations that the caesium (or other alkali metal) fluoride consumed in the reaction of equation (1) is regenerated in the reaction of equation (3)

BRIEF DESCRIPTION OF THE DRAWINGS

For a better understanding of the invention, reference will now be made, by way of exemplification only, to the accompanying drawing showing an apparatus in which the method of the invention can be performed.

DETAILED DESCRIPTION OF THE INVENTION

With reference to the drawing, there is shown in schematic form an apparatus for carrying out the method of the invention, comprising a feed pipe 1 for conveying the perfluoro-organic compound containing gas stream, an enclosed water bath 2 containing a volume of water 3 and a link pipe 4 leading in to a reaction chamber 5 and a further link pipe 6 leading, in turn, to a water scrubber chamber 7 containing silica gel, a carbon dioxide scrubber chamber 8 containing soda lime and a gas analyser 9.

The reaction chamber 5 is made of a stainless steel tube 10 heated externally, internally, or directly passing current between two water-cooled electrodes 11, 12 at either end. A charge 13 of caesium fluoride and activated charcoal (Eurocarb grade YaO) was prepared by adding a solution of caesium fluoride to the carbon and then drying in an oven until dry. The caesium fluoride charge 13 was held in place in the reaction chamber by means of a carbon wool plug at the top and bottom (as shown) of the charge.

A thermocouple temperature probe 14 is present at the center of the charge 14 for measurement of the temperature of the charge 13.

In order to heat the wall of the reaction chamber 5 and hence the charge 13, an AC power supply (4 volts/600 amps) is applied across the electrodes 11, 12 or an external oven is used. In use of the apparatus to test methods of the invention, various gas streams having different compositions of tetrafluoromethane ($CF_4$) and hexafluoroethane ($C_2F_6$) were individually passed down the pipe 1 (in these experiments from cylinders of known gas compositions) in to the water 3 of the water bath 2 and then in to the reaction chamber 5 via the pipe 4 and thence via the scrubbers 7, 8 to the gas analyser 9.

In the experiment gas streams containing 3% (by volume) $CF_4$ in nitrogen and 3% (by volume) $C_2F_6$ in nitrogen were used and the amount of water vapour introduced therein by the water bath 2 was varied by changing the temperature of the water 3 in the water bath 2. For example, at 60° C. the water vapour pressure was calculated to be 149 mm Hg and therefore a gas mixture of 3% $CF_4$, 19% water and 78% $N_2$ (by volume). At different water bath temperatures, the calculated water vapour contents of the gas streams were varied between 3% and 50% (by volume).

Further tests were conducted with a reaction chamber charge of potassium fluoride, sodium fluoride and lithium fluoride to replace the caesium fluoride used in the above tests.

All the tests were conducted at 800° C. for the caesium fluoride charges, at 855° C. for the potassium fluoride charges, at 930° C. for the sodium fluoride charges and at 945° C. for the lithium fluoride charges.

In all the tests a destruction efficiency in excess of 98% of the perfluoroalkanes was achieved as evidenced by the readings of the gas analyser 9.

The method of the invention is particularly applicable to the treatment of gas streams from a semiconductor process tool, and specifically where this tool is an etch or PECVD system.

We claim:

1. A method for treating a gas stream containing one or more perfluoro-organic compounds to remove the perfluoro-organic compound(s) therefrom, which comprises bringing the gas stream into contact with an alkali metal fluoride in the presence of carbon and water vapour at a temperature of 350° C. to 1000° C.

2. The method according to claim 1 in which the alkali metal fluoride is caesium fluoride, potassium fluoride, sodium fluoride or lithium fluoride or mixtures thereof.

3. The method according to claim 1 in which the alkali metal fluoride is caesium fluoride.

4. The method according to claim 1 in which the alkali metal fluoride is present at the beginning of the method.

5. The method according to claim 1 in which the alkali metal fluoride is formed in situ during the method.

6. The method according to claim 1 in which carbon is present as an activated carbon or activated charcoal.

7. The method according to claim 6 in which the carbon is in granular/powdered form having a high surface area.

8. The method according to claim 1 carried out at a temperature of 350° C. to 1000° C.

9. The method according to claim 8 in which the alkali metal fluoride is caesium fluoride and carried out at a temperature of 350° C. to 830° C.

* * * * *